UNITED STATES PATENT OFFICE.

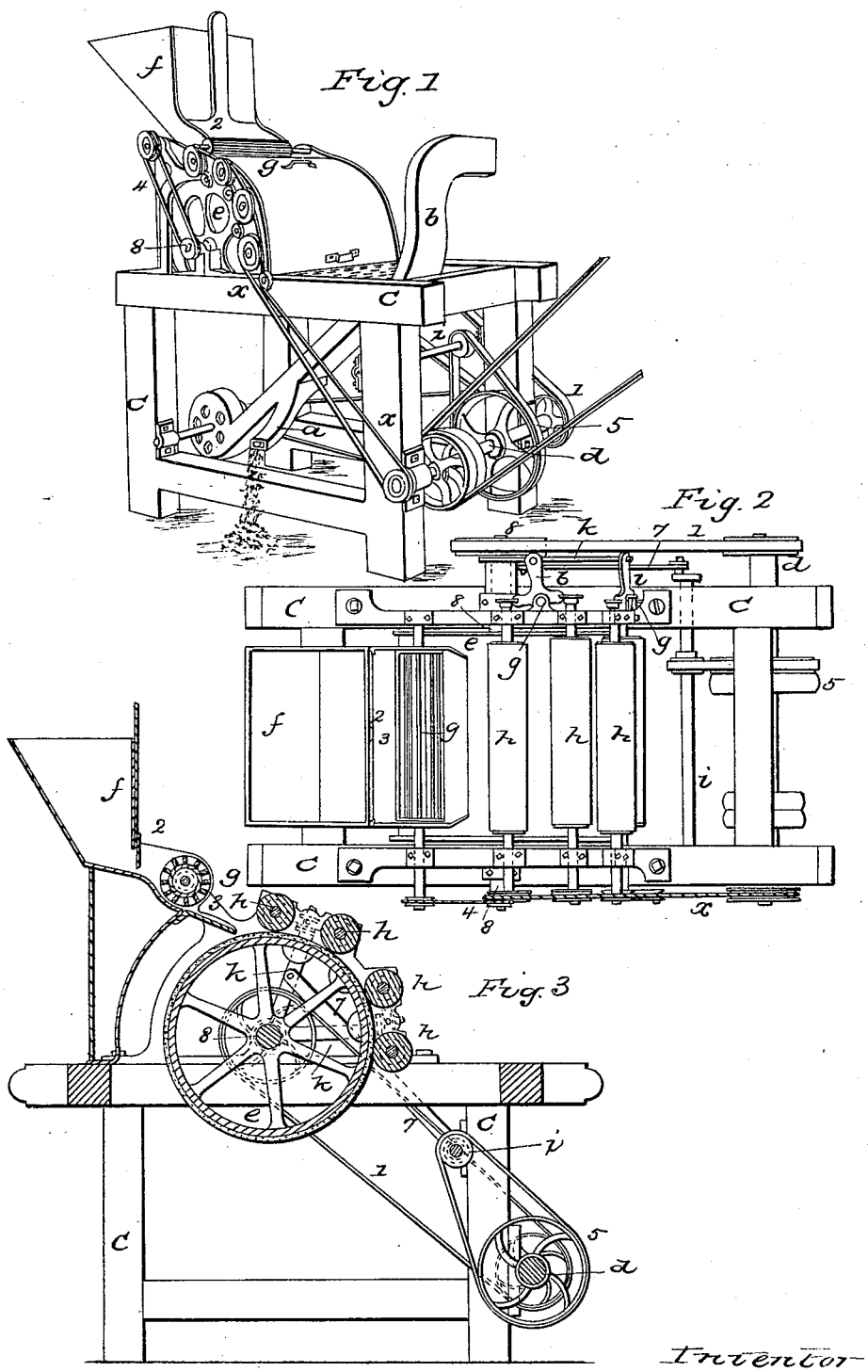

R. P. WALKER, OF NEW YORK, N. Y.

MACHINE FOR HULLING RICE.

Specification of Letters Patent No. 20,833, dated July 6, 1858.

*To all whom it may concern:*

Be it known that I, ROBERT P. WALKER, of the city and State of New York, have invented, made, and applied to use certain new and useful Improvements in Machines for Hulling Rice and other Grains or Seeds; and I do hereby declare that the following is a full, clear, and exact description of the nature and operation of my said invention, reference being had to the accompanying drawing, making part of this specification, in which—

Figure 1, is a perspective view of the whole machine. Fig. 2, is a plan without the winnowing apparatus and Fig. 3, is a vertical central section of Fig. 2.

Similar marks of reference denote corresponding parts.

In many grains and seeds, and in rice particularly, the hull is so firmly attached to the berry, that the rubbing necessary to remove the same breaks a large proportion of the grains, involving considerable loss. With rice the hulls require to be slid off endwise, as in that manner the grains are less injured and the hulls removed with greater ease.

Having arrived by experiment at the conclusions above stated, particularly in regard to rice, it has been my object in the present invention to accomplish, by machinery, the operations above stated; and for this purpose I supply a thin flat stream of rice onto a cylinder covered with emery, and cause the same to pass beneath elastic rollers, (I prefer india rubber) whose surfaces travel at a slight difference of speed to the main cylinder to cause a rolling and rubbing motion between the cylinder and its rollers; and to said rollers I impart simultaneously an endwise motion which slips the hull endwise off the rice insuring a proper hulling, with very little waste from broken berries. From the hulling part of the machine the grains and hulls may pass to a separate winnower or a winnower may be attached as seen in Fig. 1, from which the rice passes by a spout $a$, while the hulls are blown away by the pipe $b$, in any usual manner.

In the drawing $c$, is the frame of the machine on which is the main shaft $d$, driven by any competent power.

1, is a belt to the main cylinder $e$, that revolves in journals on the main frame $c$.

$f$ is a hopper supported from said frame and receiving the rice or other grains to be hulled.

2, is a slide by which the long narrow mouth for the discharge of grains is regulated.

$g$ is a cylinder having strips or wings on its surface acting in connection with the lower part 3, of the hopper to pass onto the cylinder $e$, the required amount of rice or other grain, said cylinder being rotated slowly by a belt 4 from the shaft 8 to a pulley on its own shaft.

Above and toward the side of the cylinder $e$, the main frame is adapted to receive rollers $h$, $h$, $h$, $h$, which may be two, three or more in number. I however prefer four; these are set on shafts that are parallel and pass through journals on a metal frame attached to the frame $c$, so that the rollers can receive an endwise vibrating motion, as well as a rotary motion. These rollers $h$, should revolve with the surfaces next the main cylinder $e$, moving in the same direction as said cylinder but at a different speed, which should be rather slower than the travel of the cylinder. The operation of this part is that as the rice or other grains travel with the main cylinder $e$ they pass beneath these rollers $h$, $h$, which are successively a very little closer to the surface of the cylinder $e$, and covered with india rubber or other elastic material; this allows the grains partially to embed themselves while the cylinder $e$, grinds against and abrades the hulls; and for this purpose the cylinder $e$, is to be coated thoroughly with emery; and simultaneous with this operation the rollers $h$, receive an endwise motion by a means hereafter detailed that acts to slide the hull endwise off the rice or other grain; and in this manner each of the rollers acts successively until all the hulls are loosened and removed and the hulls and grains fall away into the blast of a winnower ($a$, Fig. 1) or are taken by a suitable spout to a separate winnower.

The manner of communicating an endwise motion to the rollers $h$, $h$, at the same time that they rotate by the belt $x$, is as follows: $i$, is a shaft driven by a belt from a pulley 5, on the shaft $d$, and on the end of this shaft $i$, is a short crank or eccentric 6, from which a rod 7, connects to a lever frame $k$, having the shaft 8, as its center of motion. The ends of the arms of this lever frame $k$, connect with the double levers *l*, that are set on the fulcrums 9, and the ends of said levers *l*, are notched to take the edges of disks attached to the shafts of the rollers *h*, so that as the frame *k*, vibrates by the crank 6, the said rollers *h h* receive an endwise motion for the purpose aforesaid. The endwise motion might be communicated to the cylinder *e*, instead of to the rollers *h h*, but it is preferable to move the rollers. And these said rollers *h h*, having elastic surfaces may be coated with emery to prevent wear.

Having thus described the nature and operation of my said invention, I do not claim wheels or cylinders covered with emery in themselves, neither do I claim india rubber or elastic rollers in themselves, but I am not aware that a surface of emery has ever before been used in connection with an elastic roller or surface, to one or both of which a motion is communicated so that the emery abrades and removes the hulls of the rice or grains while partially embedded and held by the elastic surface as specified.

What I claim as my invention and desire to secure by Letters Patent is—

1. A surface of emery in combination with an india rubber or other elastic surface for hulling rice or other grains, when motion is communicated to one or both of said surfaces, in such a manner that the said surface of emery abrades the hulls for removing the same, as the rice or other grain is partially embedded or retained by the said elastic surface, for the purposes and substantially as specified.

2. I claim imparting an endwise motion to an elastic roller or its equivalent in combination with a revolving roughened surface, when the same is used for the purpose of hulling rice or other grains, substantially as specified.

In witness whereof I have hereunto set my signature this twelfth day of May, 1858.

ROBERT P. WALKER.

Witnesses:
LEMUEL W. TERRELL,
JAMES S. DIACK.